US005579567A

United States Patent [19]

Acevedo

[11] Patent Number: 5,579,567

[45] Date of Patent: Dec. 3, 1996

[54] PIN UNSEATING TOOL

[76] Inventor: Robert Acevedo, 812 Yosemite Dr., Ukiah, Calif. 95482

[21] Appl. No.: 421,367

[22] Filed: Apr. 12, 1995

[51] Int. Cl.[6] .................................................... B23P 19/04

[52] U.S. Cl. .......................... 29/275; 29/254; 29/DIG. 46

[58] Field of Search .......................... 29/426.5, DIG. 46, 29/275–277, 254, 255, 264; 81/464

[56] References Cited

U.S. PATENT DOCUMENTS

| | | | |
|---|---|---|---|
| 3,209,445 | 10/1965 | Moskovitz | 29/275 |
| 3,529,497 | 9/1970 | Brooks | 29/254 |
| 4,387,697 | 6/1983 | Duke | 29/254 |
| 4,675,968 | 6/1987 | Bartlett | 29/254 |
| 4,807,349 | 2/1989 | Blackmore | 29/DIG. 46 |
| 4,936,003 | 6/1990 | Gloe | 29/275 |
| 5,075,947 | 12/1991 | Jessup et al. | 29/254 |

*Primary Examiner*—Robert C. Watson
*Attorney, Agent, or Firm*—Jack Lo

[57] ABSTRACT

A pin unseating tool is adapted for unseating tapered pins firmly seated in tapered sockets. The tool includes a shank having one end removably attached to an adapter. The adapter has a threaded hole for screwing onto any tapered pin having a threaded tip that extends out of the socket. Mounting an air impact hammer to the other end of the shank and applying a repeating pounding force along the axis of the tool will quickly and effortlessly unseat the pin. The adapter is securely screwed onto the pin, so that it will not bounce off during the procedure, or damage the thread thereon. The adapter is removable from the shank, so that other adapters with different size holes can be fitted onto the shank for unseating pins of different sizes.

9 Claims, 1 Drawing Sheet

PIN UNSEATING TOOL

BACKGROUND OF THE INVENTION

1. Field of the Invention

This invention relates generally to automotive tools, specifically to a pin unseating tool for unseating tapered pins.

2. Prior Art

A typical motor vehicle has many parts in its suspension and steering system that are connected by tapered pins seated in tapered sockets. E.g., in the steering system, the tie rod end has an integral, tapered pin with a threaded tip. The pin is seated in a tapered through-hole or socket at the end of an "Ackermann" arm. The threaded tip of the pin extends out the back of the "Ackermann" arm, so that a nut screwed thereon tightens it in the socket. The tapers on both the pin and the socket are exactly complementary, so that a very tight fit is achieved for preventing the pin from loosening. Many other parts in a vehicle, as well as other machinery, are connected with similar pins and sockets.

However, when these parts need to be separated for servicing or replacement, the tight fit, which works so well for preventing inadvertent loosening, also works to make the separation of the parts very difficult. For a tie rod end, a "pickle fork" is typically used for separating it from the "Ackermann" arm. A "pickle fork" is a tool with a handle and two prongs extending therefrom for positioning around a pin. The prongs have tapering upper and lower surfaces, so that they can be manually forced between the tie rod end and the "Ackermann" arm to separate them by leveraging the handle. This is a difficult and tiring method at best.

Other devices for removing other types of pins and work pieces have also been proposed. U.S. Pat. No. 3,964,152 to Shankwitz et al. (1976) shows an apparatus with a tapered pin seated in a tapered cup that completely encloses the distal end of the pin. A threaded hole in the center of the socket allows a bolt to be wrenched in therethrough to force the pin out of the socket. This apparatus forms a complete system in itself, so that no part of it can be used for unseating other types of pins, such as tie rod end pins.

U.S. Pat. No. 4,852,231 to Turner (1989) and U.S. Pat. No. 4,989,310 to Choat (1991) show pin removal devices that each includes a frame with a hole on a top side thereof. A work piece is placed against the frame, and the pin aligned with the hole. A hydraulic jack or ram is used to push the pin out of the work piece, and through the hole in the frame. These devices can only unseat pins that are not fixedly attached to anything else. They cannot be used for unseating pins such as tie rod end pins, because the tie rod ends cannot be pushed through the hole in the frame.

U.S. Pat. No. 3,861,250 to Zugai (1975) shows a tool for loosening frozen bolts. It includes a shaft for being fitted to an air impact hammer that provides a strong vibrating force. A socket fitted to the end of the shaft applies the vibrating force on a frozen bolt to loosen it. The socket has an interior contour for preventing rotational slippage. Although the socket can physically fit over the tip of a tie rod end pin, the strong vibrating force will cause it to bounce off the pin, or damage the thread by scraping the thread with its rim.

OBJECTS OF THE INVENTION

Accordingly, an object of the present invention is to provide a pin unseating tool that can be attached to an air impact hammer for quickly and effortlessly unseating pins from their sockets.

Another object of the present invention is to provide a pin unseating tool that will positively not bounce off a pin or damage its threaded tip.

Still another object of the present invention is to provide a pin unseating tool that can be easily adapted to fit pins of different sizes.

Other objects of the invention will become apparent from a study of the drawing figures and the following description.

SUMMARY OF THE INVENTION

A pin unseating tool includes a shank having one end for being fitted to an air impact hammer, and an other end attached to an adapter, which includes a hole sized and threaded for screwing onto the threaded end of a pin. When the hammer is activated, it applies a repeating pounding force against the pin to unseat it from its socket. The adapter and the pin are securely screwed together, so that they will not bounce apart, and the adapter will not damage the thread on the pin.

DRAWING REFERENCE NUMERALS

10. Pin Unseating Tool
11. Shank
12. Flange
13. Adapter
14. Proximal End Of Adapter
15. Threaded Hole
16. Threaded End Of Shank
17. Distal End Of Adapter
18. Threaded Hole
19. Socket Of Air Impact Hammer
20. Air Impact Hammer
21. Threaded Tip Of Pin
22. Tapered Pin
23. Tapered Socket
24. Support Structure
25. Tie Rod End

DETAILED DESCRIPTION OF THE PREFERRED EMBODIMENT

Figure 1:
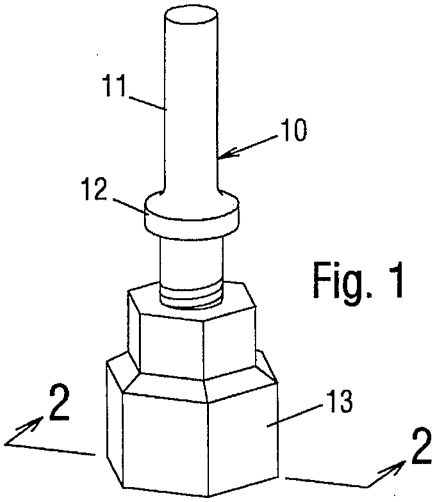
FIG. 1 is a front perspective view of a pin unseating tool in accordance with a preferred embodiment of the invention.

In accordance with a preferred embodiment of the invention shown in the side perspective view of FIG. 1, a pin unseating tool 10 includes a shank 11, a flange 12, and a hexagonal adapter 13.

Figure 2:
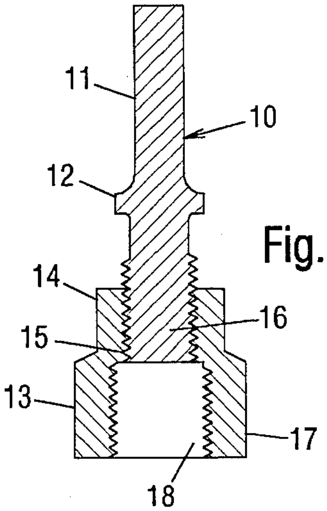
FIG. 2 is a side sectional view of the pin unseating tool, taken along line 2—2 in FIG. 1.

As shown in the side sectional view of FIG. 2, adapter 13 includes a proximal end 14 with a threaded hole 15 that removably receives a threaded end 16 of shank 11. Adapter 13 also includes a distal end 17 with a threaded hole 18. Shank 11 and holes 15 and 18 are positioned along the same axis.

Figure 3:
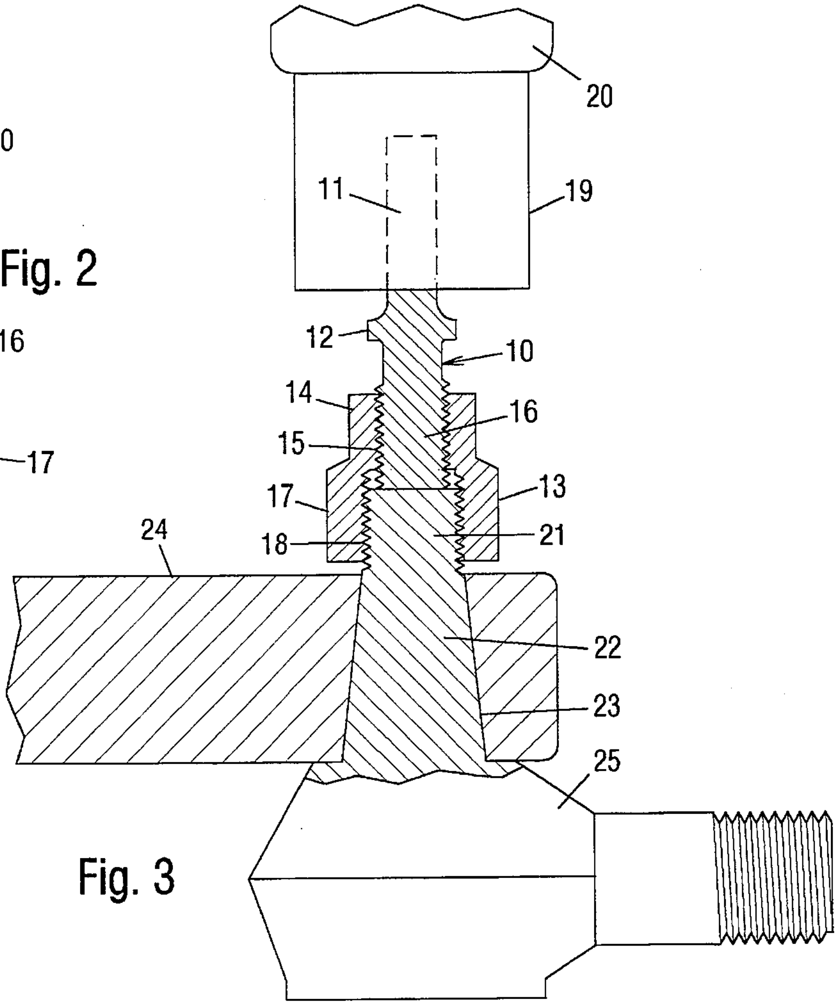
FIG. 3 is a partial cutaway side view of the pin unseating tool in use on a pin.

To use, shank 11 of tool 10 is inserted into a socket 19 of a conventional air impact hammer 20 (partially shown), as shown in the partial cutaway view of FIG. 3. Distal end 17 of adapter 13 is screwed onto a threaded tip 21 of a tapered pin 22, which is tightly seated within a tapered through-hole or socket 23 in a support structure 24. Pin 22 tapers toward threaded tip 21, which extends out of socket 23. In this example, pin 22 is a part of a conventional tie rod end 25, and support structure 24 is a conventional "Ackermann" arm, which would preferably be immobilized by being mounted in a vise (not shown). Hexagonal adapter 13 can be wrenched onto tip 21 if the fit is too tight for turning by hand. Distal end 17 is first mounted so that it is spaced slightly away from support structure 24, then shank 11 is screwed inwardly until it is in tight contact with the flat end of tip 21.

When hammer 20 is activated, it applies a powerful vibrating or repeating pounding force longitudinally along the axis of shank 11, which transfers the force to pin 22 to unseat it from socket 23 in a matter of seconds. The force is transferred directly from threaded end 16 to tip 21, so that the thread on tip 21 is spared from excessive stress. Because adapter 13 is screwed onto pin 22, it will not bounce off tip 21 or scrape the thread. After pin 22 is loosened, tool 10 is removed therefrom, so that pin 22 can be pulled through socket 23.

Different adapters 13 can be made with the same size hole 15, but each with hole 18 of a different size, so that they can be interchangeably fitted onto shank 11 for unseating different size pins. Tool 10 can be used for unseating other pins in addition to the ones on tie rod ends, including non-tapered, cylindrical pins.

CONCLUSION, RAMIFICATIONS, AND SCOPE

Accordingly the reader will see that I have provided a pin unseating tool that can quickly and effortlessly unseat a pin from its socket. It will not bounce off the end of a pin or damage its threads. It can also be easily adapted for fitting and unseating pins of different sizes.

Although the above descriptions are specific, they should not be considered as limitations on the scope of the invention, but only as examples of the preferred embodiment. Many other ramifications and variations are possible within the teachings of the invention. For example, the adapter can be made with a different number of flat sides, such as four. The shank and the adapter can be made as a single, integral piece. The screw-on connection between the shank and the adapter can be replaced with a quick-disconnect, such as that commonly found on socket and ratchet sets. The tool can be fitted onto any device that supplies a suitable longitudinal vibrating or pounding force along the axis of the shank. Therefore, the scope of the invention should not be determined by the examples given, but by the appended claims and their legal equivalents.

I claim:

1. A tool for unseating a pin firmly seated within a socket extending completely through a support structure, said pin having a threaded tip extending out of said socket, comprising:

an adapter having coaxial first and second threaded holes extending therethrough, said first and second threaded holes being communicably connected, said first hole being adapted to be securely screwed onto said threaded tip of said pin to prevent inadvertent loosening; and an elongated shank having a threaded end screwed into said second threaded hole until said threaded end is in abutting engagement with said threaded tip of said pin, said shank having another end being adapted to be attached to an air hammer means for applying a repeating pounding force longitudinally along said shank for unseating said pin from said socket, said threaded end of said shank being adapted to transmit said force directly onto said threaded tip of said pin, so as to avoid damaging a thread thereon.

2. The tool of claim 1 wherein said first hole is larger in diameter than said second hole.

3. The tool of claim 1, further including a flange around said shank.

4. A tool for unseating a pin firmly seated within a socket extending completely through a support structure, said pin having a threaded tip extending out of said socket, comprising:

an adapter having a plurality of flat exterior sides adapted for being turned by a wrench, said adapter having coaxial first and second threaded holes extending therethrough, said first and second threaded holes being communicably connected, said first hole being adapted to be securely screwed onto said threaded tip of said pin to prevent inadvertent loosening; and an elongated shank having a threaded end screwed into said second threaded hole until said threaded end is in abutting engagement with said threaded tip of said pin, said shank having another end being adapted to be attached to an air hammer means for applying a repeating pounding force longitudinally along said shank for unseating said pin from said socket, said threaded end of said shank being adapted to transmit said force directly onto said threaded tip of said pin, so as to avoid damaging a thread thereon.

5. The tool of claim 4 wherein said first hole is larger in diameter than said second hole.

6. The tool of claim 4, further including a flange around said shank.

7. A tool for unseating a pin firmly seated within a socket extending completely through a support structure, said pin having a threaded tip extending out of said socket, comprising:

a hexagonal adapter adapted for being turned by a wrench, said adapted having coaxial first and second threaded holes extending therethrough, said first and second threaded holes being communicably connected, said first hole being adapted to be securely screwed onto said threaded tip of said pin to prevent inadvertent loosening; and an elongated shank having a threaded end screwed into said second threaded hole until said threaded end is in abutting engagement with said threaded tip of said pin, said shank having another end being adapted to be attached to an air hammer means for applying a repeating pounding force longitudinally along said shank for unseating said pin from said socket, said threaded end of said shank being adapted to transmit said force directly onto said threaded tip of said pin, so as to avoid damaging a thread thereon.

8. The tool of claim 7 wherein said first hole is larger in diameter than said second hole.

9. The tool of claim 7, further including a flange around said shank.

* * * * *